United States Patent
Victor

[15] 3,675,530
[45] July 11, 1972

[54] QUICK RELEASE NUT

[72] Inventor: Michel N. Victor, 176 Crestview Drive, Pittsburgh, Pa. 15236

[22] Filed: March 17, 1970

[21] Appl. No.: 20,362

[52] U.S. Cl. ............................................................85/33
[51] Int. Cl. ..........................................................F16b 37/08
[58] Field of Search ...........................................85/33, 32

[56] References Cited

UNITED STATES PATENTS

| 797,925 | 8/1905 | Thomas | 85/33 |
| 2,374,309 | 4/1945 | Roxs | 85/33 |
| 2,261,537 | 11/1941 | Zamarra | 85/32 V |

OTHER PUBLICATIONS

German printed application, Reinigner, 1,046,410, 12-1958

Primary Examiner—Edward C. Allen
Attorney—John N. Randolph

[57] ABSTRACT

A U-shaped nut having a recess provided with a semi-circular threaded inner end and an outer portion defined by parallel wall surfaces spaced apart a distance greater than the diameter of the threaded inner end, to enable the nut to move transversely into engagement with a conventional bolt, at any point along the length of the bolt, for meshing the nut thread with the bolt thread, and a washer slidably fitting on the bolt and having a depression in one side thereof in which the nut is received and confined against lateral movement relative to the bolt. Said depression of the washer and the nut have complementary surfaces disposed in abutting engagement when the nut is fully seated in the depression to prevent lateral sliding or rocking movement of the nut relative to the bolt.

2 Claims, 8 Drawing Figures

PATENTED JUL 11 1972　　　　　　　　　　　　　3,675,530
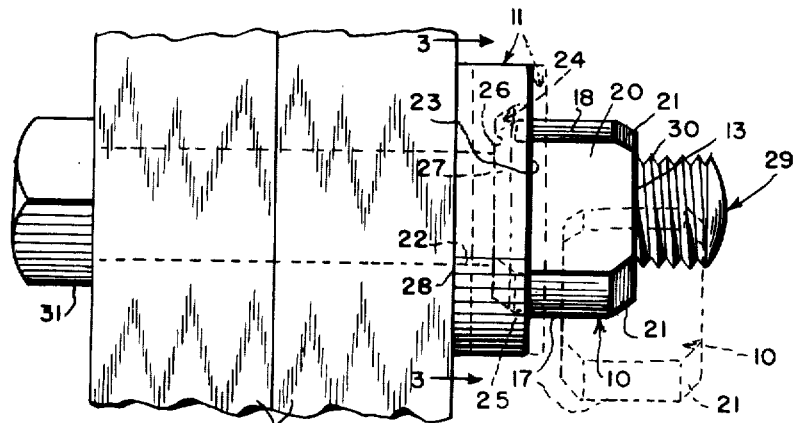
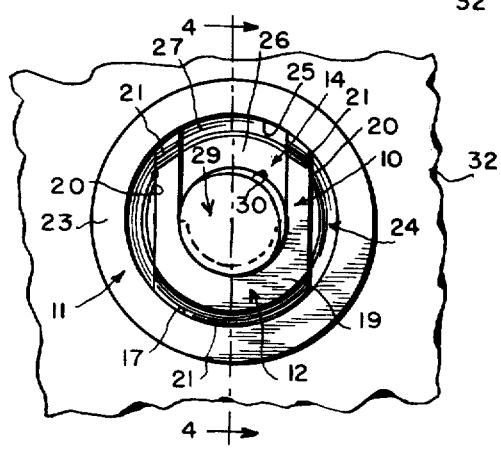
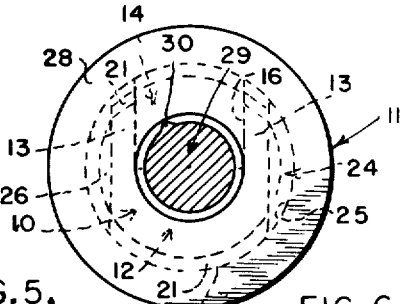
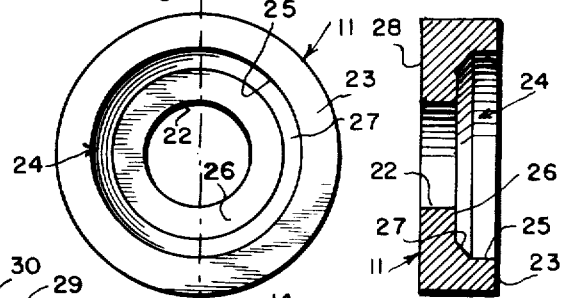
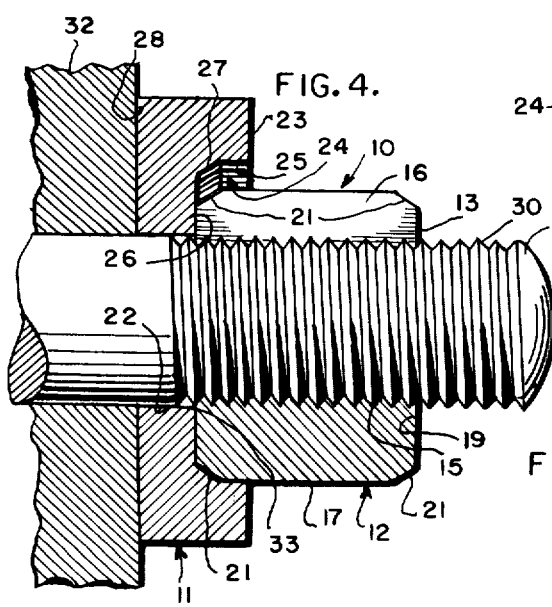
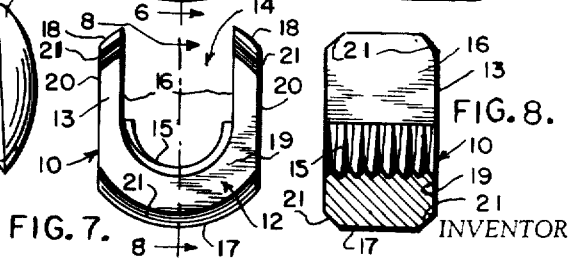
INVENTOR
MICHEL N. VICTOR
BY　*John N. Randolph*
ATTORNEY

QUICK RELEASE NUT

SUMMARY

It is a primary object of the present invention to provide a novel nut for use with a specially constructed washer and which enables the nut to be applied to a bolt, carrying the washer, at any convenient point along the length of the threaded bolt shank by lateral movement of the nut relative to the bolt, and thereafter seated in a depression of the washer by movement of the washer along the bolt toward the nut, to prevent transverse movement of the nut relative to the bolt and for retaining the threaded portion of the nut in mesh with the bolt thread, so that the nut can be tightened by only a few turns, or loosened sufficiently to be disengaged from the washer and detached from the bolt by backing off the nut a few turns from a tightened position.

Another object of the invention is to provide a nut capable of being used with a conventional machine threaded bolt.

A further object of the invention is to provide a nut and washer having co-acting abutting surfaces which cooperate to prevent transverse movement of the nut relative to the bolt or rocking movement of the nut relative to the bolt, when the nut is in threaded engagement with the bolt and is seated in the depression or socket of the washer.

Still a further object of the invention is to provide a nut that is so constructed that it may turn in unison with or relative to the washer when the nut is seated in the washer depression and retained thereby in threaded engagement with the bolt.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a side elevational view showing the nut and washer applied to a bolt and tightened for securing two members between the bolt head and washer;

FIG. 2 is an end elevational view looking from right to left of FIG. 1;

FIG. 3 is a cross sectional view, primarily in elevation, taken substantially along a plane as indicated by the line 3—3 of FIG. 1;

FIG. 4 is an enlarged fragmentary longitudinal sectional view, taken substantially along a plane as indicated by the line 4—4 of FIG. 2;

FIG. 5 is an elevational view looking toward the recessed side of the washer;

FIG. 6 is a sectional view of the washer, taken substantially along a plane as indicated by the line 6—6 of FIG. 5;

FIG. 7 is a plan view looking toward one of the corresponding opposite sides of the nut, and FIG. 8 is a sectional view thereof, taken substantially along a plane as indicated by the line 8—8 of FIG. 7.

DESCRIPTION OF THE PREFERRED EMBODIMENT

Referring more specifically to the drawing, the invention in its entirety comprises a novel nut 10, as best seen in FIGS. 7 and 8, and a novel washer 11, as best shown in FIGS. 5 and 6.

The nut 10 is substantially U-shaped and includes a base portion 12 from which projects corresponding legs 13 which combine with the base 12 to define a relatively deep recess 14. The inner end of the recess 14, formed by the inner side of the base 12, is semi-circular and is threaded, as seen at 15. The substantially flat parallel inner faces 16 of the legs 13, defining the outer portion of the recess 14, are spaced apart a distance greater than the diameter of the semi-circular threaded portion 15.

The base 12 has a convexly curved outer side 17. The terminals of the legs 13 are bevelled on their outer sides to provide convex surfaces 18. The surfaces 17 and 18 define parts of a circle having a center corresponding to the center of the threaded portion 15 so that the surfaces 17 and 18 are disposed concentric to the threaded portion 15 of the nut.

The nut 10 has corresponding substantially flat and parallel opposite faces 19 which are disposed perpendicular to the axis of the threaded portion 15, and substantially flat outer sides 20 forming wrench lands, which are disposed perpendicular to the faces 19.

The nut 10 has inclined surfaces 21 extending between the faces 19 and the convex surfaces 17 and 18 for a purpose which will hereinafter be described.

The washer 11 has a central opening 22. One face 23 of the washer 11 is recessed to provide a socket 24 having a cylindrical wall 25 which is disposed concentrically around the opening 22, and a substantially flat bottom wall 26. The socket 24 has an annular inclined wall 27 extending between the bottom wall 26 and the cylindrical wall 25 and which is disposed at an incline relative to the wall 26 corresponding approximately to the incline of the surfaces 21 relative to the faces 19 adjacent thereto. The other side 28 of the washer 11 provides a substantially flat annular surface disposed around the opening 22.

FIGS. 1 through 4 show the nut 10 and washer 11 applied to a conventional bolt 29 having a machine thread 30 and provided with a head 31 at one end thereof. The bolt 29 is shown extending through two rigid members 32 and with the bolt head 31 abutting against the outer side of one of said members. The opening 22 is of a diameter sufficient to permit the washer 11 to be slid longitudinally over the threaded end of the bolt for positioning its face 28 against the outer side of the other member 32. The spacing between the nut faces 16 is slightly greater than the diameter of the bolt thread 30 to permit the nut 10 to be slid transversely into engagement with the bolt 29, as indicated in broken lines of FIG. 1, with either side 19 facing toward the washer 11. The nut 10 from its broken line position of FIG. 1 would be moved from right to left against the washer face 23 and then displaced upwardly to mesh the thread 15 with a portion of the bolt thread 30. The diameter of a circle portions of which are formed by the surfaces 17 and 18 of the nut 10 is substantially equal to the diameter of the wall 25, so that when the threaded portion 15 is meshing with the bolt thread 30, the washer 11 can be moved from left to right of FIG. 1 from its full line to its broken line position for seating a portion of the nut 10 in the socket 24.

As seen in FIGS. 1 and 4, the nut 10 is substantially wider than the washer 11 so that a conventional wrench, not shown, can then be applied to the lands 20 for rotating the nut 10 to advance the nut and washer toward the members 32 for clamping the members 32 between the bolt head 31 and the face 28 of the washer, as illustrated in full lines of FIG. 1.

It will thus be seen that irrespective of the length of the bolt 29, the nut 10 can be applied thereto and tightened with only a few turns. Conversely, from its tightened position, the nut 10 can be backed off a few turns to disengage it from the socket 24 so that it can then be removed transversely from the bolt 29.

Since the nut thread 15 engages only one-half of the circumference of the bolt thread 30 so that the nut is not supported by the bolt thread against rocking movement, the nut will tend to rock clockwise, as seen in FIG. 4, as it is tightened. However, the inclined surfaces 21 and 27 will contact and generate a torque tending to rock the nut counterclockwise about the point 33, FIG. 6, towards the axis of the bolt as the nut is tightened. This force is directly proportional to the distance between the bottom thread and any point along the engaged portion of the threads. This force, added to the force produced by reaction between parallel surfaces 17 and 25 is greater than the radial component of the axial load tending to separate the engaged portion of the nut and bolt. Thus, the nut will remain engaged and will have the same functional characteristics as the conventional hexagon nut.

Various modifications and changes are contemplated and may be resorted to, without departing from the function or scope of the invention.

I claim as my invention:

1. The combination of a washer and a nut adapted to engage a conventional headed bolt, said washer having a central opening to slidably receive the threaded bolt shank, one face of the washer having an outwardly opening socket including a cylindrical wall of uniform diameter disposed concentrically around said opening and a substantially flat circular bottom; said nut being U-shaped and including a base and corresponding legs projecting from said base and having spaced apart substantially parallel inner faces combining with an inner face of the base to define a recess to receive the threaded bolt shank when the nut is displaced transversely into engagement therewith, said inner face of the base being threaded to provide a semi-circular threaded portion which meshes with a portion of the bolt thread, said nut having a major transverse dimension no greater than the diameter of the cylindrical wall to be received in the socket when the washer is displaced along the bolt toward the nut and the nut thread is meshing with the bolt thread, said base having a convex outer face of uniform diameter a part of which is disposed in engagement with said annular wall of the socket to retain the nut thread in engagement with the bolt thread to enable the nut and washer to be moved axially in either direction along the bolt by rotation of the nut, said nut having a flat side seating against said socket bottom when the nut is in engagement with the socket, the largest diameter of the flat side being substantially equal to the largest diameter of the flat bottom, said socket having an annular inclined surface disposed between said bottom and the cylindrical wall, and said nut having an inclined surface extending between said flat side and said convex outer face and abutting a portion of the inclined surface of the socket when the nut is seated in the socket, said inclined surface of the nut having a convex peripheral portion in axial alignment with and concentric with the convex outer face of the nut base.

2. The combination as defined by claim 1, said legs of the nut having terminal portions defining convex surfaces engaging portions of the cylindrical wall of the socket and inclined surfaces engaging portions of said annular inclined surface of the socket when the nut is seated in the socket.

* * * * *